United States Patent
Stone et al.

(10) Patent No.: US 11,798,175 B2
(45) Date of Patent: *Oct. 24, 2023

(54) OBJECTS AND FEATURES NEURAL NETWORK

(71) Applicant: HEWLETT PACKARD ENTERPRISE DEVELOPMENT LP, Houston, TX (US)

(72) Inventors: Theodore Stone, Palo Alto, CA (US); Puneet Jain, Palo Alto, CA (US); Nathaniel Stone, Palo Alto, CA (US); Kyu Han Kim, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,103

(22) Filed: Oct. 11, 2021

(65) Prior Publication Data
US 2022/0027669 A1  Jan. 27, 2022

Related U.S. Application Data

(63) Continuation of application No. 16/049,107, filed on Jul. 30, 2018, now Pat. No. 11,158,063.

(51) Int. Cl.
*G06T 7/246* (2017.01)
*G06N 3/08* (2023.01)
(Continued)

(52) U.S. Cl.
CPC ............ *G06T 7/248* (2017.01); *G06N 3/08* (2013.01); *G06T 7/246* (2017.01); *G06V 10/75* (2022.01);
(Continued)

(58) Field of Classification Search
CPC .......... G06T 7/246; G06T 2207/10016; G06T 2207/20081; G06T 2207/20084;
(Continued)

(56) References Cited

U.S. PATENT DOCUMENTS 11,158,063 B2 * 10/2021 Stone ............... G06V 10/75
2017/0186176 A1 * 6/2017 Paluri ............... G06V 10/764
(Continued)

FOREIGN PATENT DOCUMENTS

CN          107341517 A    11/2017
WO     2017/214872 A1    12/2017

OTHER PUBLICATIONS

Zhan "Change Detection based on Deep Siamese Convolutional Network for Optical Aerial Images" IEEE Geoscience and Remote Sensing Letters. Oct. 2017. (Year: 2017).*
(Continued)

*Primary Examiner* — Molly Wilburn
(74) *Attorney, Agent, or Firm* — Hewlett Packard Enterprise Patent Department

(57) ABSTRACT

Examples include detecting objects and determining a set of features for the objects. Examples include receiving a first image input, generating a number of feature maps from the first image input using a number of convolution filters, generating a first number of fully connected layers directly based on the number of feature maps, and detecting a number of objects in the first image and determining a set of features for each object from the first number of fully connected layers.

20 Claims, 7 Drawing Sheets

(51) Int. Cl.
*G06V 10/75* (2022.01)
*G06V 10/764* (2022.01)
*G06V 10/82* (2022.01)

(52) U.S. Cl.
CPC ............ *G06V 10/764* (2022.01); *G06V 10/82* (2022.01); *G06T 2207/10016* (2013.01); *G06T 2207/20081* (2013.01)

(58) Field of Classification Search
CPC ........ G06T 7/248; G06N 3/08; G06N 3/0481; G06N 3/0454; G06N 3/084; G06K 9/6201; G06V 10/75; G06V 10/764; G06V 10/82
See application file for complete search history.

(56) References Cited

U.S. PATENT DOCUMENTS

| | | | | |
|---|---|---|---|---|
| 2018/0060649 A1* | 3/2018 | Kastaniotis | .......... | G06V 10/774 |
| 2018/0108139 A1* | 4/2018 | Abramoff | ............ | G06N 3/0454 |
| 2018/0365564 A1* | 12/2018 | Huang | ..................... | G06N 3/04 |
| 2019/0377987 A1* | 12/2019 | Price | ........................ | G06N 3/08 |
| 2020/0193299 A1* | 6/2020 | Geva | .................... | G06V 10/255 |

OTHER PUBLICATIONS

Alam, M. et al., Efficient Feature Extraction with Simultaneous Recurrent Network for Metric Learning, (Research Paper), International Joint Conference on Neural Networks (IJCNN), Jul. 24-29, 2016, 2 Pgs.

Bertinetto et al., "Fully-convolutional Siamese networks for object tracking", European Conference on Computer Vision, 2016, 16 pages.

Bromley et al., "Signature verification using a "Siamese" time delay neural network", Proceedings of the 6th International Conference on Neural Information Processing Systems, 1993, pp. 737-744.

Dollar, P. et al., Fast Feature Pyramids for Object Detection, (Research Paper), Submission to IEEE Transactions on Pattern Analysis and Machine Intelligence, Retrieved Jun. 4, 2018, 14 Pgs.

Gladh et al., "Deep Motion Features for Visual Tracking", 23rd International Conference on Pattern Recognition (ICPR), 2016, 6 pages.

Hadsell et al., "Dimensionality Reduction by Learning an Invariant Mapping", Proceedings of the 2006 IEEE Computer Society Conference on Computer Vision and Pattern Recognition—vol. 2, 8 pages.

Held et al., "Learning to Track at 100 FPS with Deep Regression Networks", Computer Vision—ECCV 2016, 17 pages.

Liu et al., "SSD: Single Shot MultiBox Detector", Computer Vision and Pattern Recognition, 2016, 17 pages.

Liu, Hong, "An End-To-End Siamese Convolutional Neural Network for Loop Closure Detection in Visual Slam System" 2018 IEEE International Conference on Acoustics, Speech and Signal Processing. Apr. 15-20, 2018. (Year: 2018).

Ren et al., "Faster R-CNN: Towards real-time object detection with region proposal networks", Advances in Neural Information Processing Systems 28, 2015, 9 pages.

Simonyan et al., "Very Deep Convolutional Networks for Large-Scale Image Recognition", Computer Vision and Pattern Recognition, 2014, 14 pages.

Wonneberger, S. et al., Parallel Feature Extrnction and Heterogeneous Object-detection for Multi-camera Driver Assistance Systems, (Research Paper), 25th International Conference on Field Programmable logic and Applications (FPL), Sep. 2-4, 2015, 4 Pgs.

* cited by examiner

OBJECTS AND FEATURES NEURAL NETWORK

BACKGROUND

Neural networks may be used for video analytics in which an object is tracked across a scene. In some situations, however, the scene may include multiple objects. These multiple objects may be moving in different directions, at different speeds, and enter/exit the scene at different times. The neural network should be able to distinguish between these objects and track movement of old objects as well as entry of new objects from one frame to the next.

BRIEF DESCRIPTION OF THE DRAWINGS

The following detailed description references the drawings, wherein.

DETAILED DESCRIPTION

Figure 1:
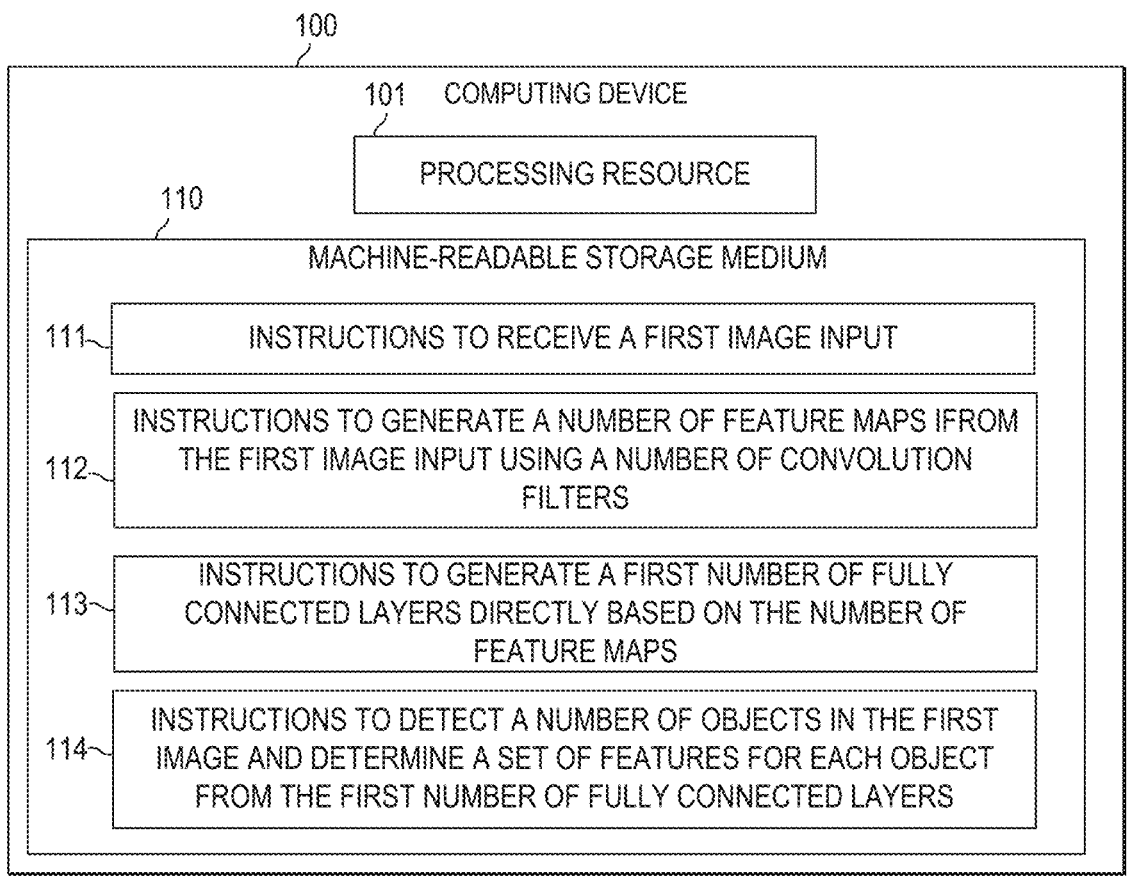
FIG. 1 is a block diagram of a computing device to determine a number of objects and a set of features for each object using one convolution layer, according to some examples.

To track objects in a scene, a neural network may rely on determination of features in a detected object. If the determined features of one detected object in a first frame are the same as the determined features of another detected object in a second frame, then the detected object in the first frame is the same object as the detected object in the second frame. This may indicate that the object from the first frame has moved locations or positions from the time at which the first frame was taken to the time at which the second frame was taken. If the determined features are different, then this may indicate that the detected objects in the first frame and in the second frame are different.

In some examples, for accurate tracking of a video stream in real-time (at least 15 frames per second or higher, e.g., 20 frames per second, 30 frames per second, etc.), the time that the neural network takes to determine features should be a small time period. This is because slower time periods may mean that fast moving objects are unseen or lost by the neural network.

Some neural networks use sequential and additive convolution filters to detect the object and extract the features. Thus, in these neural networks, the object detection is done via a first round of convolution filters and the feature extraction or determination is done via a second round of convolution filters that act on the feature maps of the first round of convolution filters. Separate rounds of convolution filters exponentially increase the time required for each frame to detect an object and extract the features. Additionally, a scene may include numerous objects to track. This poses a challenge such neural networks because the feature computation latency dominates over the detection latency. Accordingly, these neural networks are not adequately equipped to be used in real-time (e.g. for accurate real-time tracking).

The present disclosure addresses these technological challenges by providing a neural network system that merges the two-step process into one. Examples disclosed herein performs object detection and feature extraction using one round of convolution filters. Examples disclosed herein also allow for the training of neural networks to determine filters and parameters that allow for one round of convolution filters of both object detection and feature extraction. For example, during training, the neural network may use a Siamese training architecture that receives two image inputs. Each mage input may have multiple objects in the image. Based on the ground truths for the two image inputs, the neural network may determine pairs in the images for comparison, and compute the contrastive loss for each pair. The contrastive loss summation of the images may be used to modify the filters and parameters for the fully connected layers. For the neural networks disclosed herein, the computational latency is not affected by the number of objects that are present in the scene. Thus, the outputs of neural networks disclosed herein (e.g., the object detection and features) may be used as an input for real-time video tracking.

In some examples, a computing device is provided with a non-transitory machine-readable storage medium. The non-transitory machine-readable storage medium includes instructions, that when executed, cause a processing resource to receive a first image input, generate a first number of feature maps from the first image input using a number of convolution filers, generate a first number of fully connected layers directly based on the first number of feature maps, and detect a number of objects in the first image and determine a set of features for each object from the first number of fully connected layers.

In some examples, a neural network system comprises an input engine, a convolution engine, and a connection engine. The input engine is to receive a first image input. The convolution engine is to generate a number of feature maps directly based on the first image input. The connection engine is to connect the number of feature maps based on relationship parameters and detect a first object in the first image and determine a feature associated to the first object based on the connected feature maps.

In some examples, a method comprises receiving a first image input, generating a number of feature maps directly from the first image using a number of convolution filters, connecting the number of feature maps into a number of fully connected layers, and detecting an object in the first image and determining a feature associated to the object based on the number of fully connected layers. The method is performed by a processing resource.

Referring now to the figures, FIG. 1 is a block diagram of a computing device 100 to detect a number of objects and determine a set of features for each object. As will be described below, computing device 100 uses one convolution layer for both of these functions. As used herein, a "computing device" may be a server, a networking device, chip set, desktop computer, workstation, a mobile phone, a tablet, a video sensor, or any other processing device or equipment. For example, computing device 100 may be a device used in the real-time tracking of objects such as a self-driving car system, etc.

Computing device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to computing device 300 in FIG. 3, or neural network system 400 in FIG. 4. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a graphics processing unit (GPU), central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, as described herein.

Instructions 111 may be executable by processing resource 101 to receive a first image input. In some examples, the source of the image input may be a video sensor (e.g., a camera) that is recording a live scene. The sensor may be directly connected to computing device 100 or it may be located in a different physical location and communicates to computing device 100. In some examples, the source of the image is from a training set of images. The set of images may be used as a data set to train computing device 100. In some examples, computing device 100 may be connected (either wired or wireless) to a network from which it receives the images.

Instructions 112 may be executable by processing resource 101 to generate a number of feature maps from the first image input. The feature maps may be generated using a number of convolution filters. As used herein, a convolution filter may include a matrix that is slid across the image input. The matrix may be comprised of mathematical operations (e.g., −1, −0.9, +1.2, etc.) that may be performed to the numbers that represent the pixels of the image input. As is described in relation to FIG. 3 and FIG. 5, the filters may be varied by changing the mathematical operations used in the filters. Thus, when training computing device 100, the filters may be varied via back-propagation. The number of feature maps that are generated are equal to the number of convolution filters. In other words, each convolution filter generates a feature map. A feature map may be comprised of the results of the mathematical operations on the pixels in the image. For example, an image may be comprised of 9 pixels, represented by the numbers as shown below. A convolution filter, represented by table 2 below, may be comprised of 4 operations. The feature map that results from sliding table 2 over table 1 is represented by table 3 below.

TABLE 1

| | | |
|---|---|---|
| 1 | −1 | 1 |
| −1 | 1 | −1 |
| 1 | −1 | 1 |

TABLE 2

| | |
|---|---|
| +1 | −1 |
| −1 | +1 |

TABLE 3

| | |
|---|---|
| +4 | −4 |
| −4 | +4 |

The number of convolution filters used and the number of feature maps that result may be configured according to an administrator of the neural network. This may depend on type of objects and the associated characteristics of the objects. In some examples, instructions 112 may include instructions to generate pooling maps from the feature maps that resizes the feature maps. This layer may be characterized as a pooling layer. In some examples, the pooling layer may define a spatial neighborhood in a feature map and take the desired element from the feature map. For example, in max pooling, the pooling layer may take the largest element (i.e. number) from the feature map. The desired element for a pooling layer may be configured according to the administrator of the neural network. The number of pooling maps may be the same as the number of feature maps.

Instructions 113 may be executable by processing resource 101 to generate a first number of fully connected layers directly based on the number of feature maps. As used herein, a fully connected layer that is "directly based on" the number of feature maps includes a fully connected layer that connects the feature maps (or maps derived from the feature maps) created by the first number of convolution filters. Thus, a fully connected layer that is directly based on the number of feature maps does not connect additional feature maps (or maps derived from additional feature maps) from other convolution rounds other than the first number of convolution filters. As used herein, a map that is derived from a feature map may include a pooling map, a rectifier map (e.g., Noisy rectified linear units (ReLUs), leaky ReLUs, etc.), etc. Thus, a derived map is generated from an operation performed on the feature map that does not generate additional maps from one feature map (like a convolution filter) that must be connected in the fully connected layer. For example, a region proposal network (RPN) may be used on the feature maps generated by the first round of convolution filters. The region proposal network may itself have convolution filters that are performed on the feature maps. However, the result of the region proposal network is to propose limited regions on the feature maps to focus on. Thus, in the fully connected layer of instructions 113, the maps generated by the convolution filters in the region proposal network are not connected. Rather, the region proposal network limits the regions in the feature maps and it is the limited maps that are connected in the fully connected layer of instructions 113. Thus, the modified feature maps (or limited feature maps as limited by the region proposed network) may be considered a derived map.

In a fully connected layer, each of the number of feature maps (or each of the number of pooling maps, in examples with a pooling layer) is connected to each other in various relationships, defined by the fully connected layer. In other words, a fully connected layer may define the previous maps in such a way that a fully connected layer may be seen as a filter or threshold for specific objects and/or features associated with those specific objects. A fully connected layer may give a specific probability that something in the first image input is an object with an associated set of features. For example, a fully connected layer may connect the prior maps and determine that a probability that the first image has a car with a particular hood attachment. In some examples, the connections between the prior maps to generate a fully connected layer may be characterized as a variable. As is described in relation to FIG. 3 and FIG. 5, the parameters of a fully connected layer may be back-propagated during training of computing device 100.

Instructions 114 may be executable by processing resource 101 to detect a number of objects in the first image and determine a set of features for each object from the first number of fully connected layers. In some examples, the detection of the object may be such that it differentiates an object as an object of interest versus an object of no interest. For example, in a system that is tracking movement, the detection of an object may be to detect that the object is a moving object and not something that is part of the background and immobile (e.g., a person versus a tree). The set of features that are determined may be features that help to identify that detected object from one frame of image to the next. For example, in a first frame, the detected object may be a person. The set of the features determined from the detected object may be a combination of colors of the person's clothing that allow the system to distinguish it from another person and/or another object in a second frame.

In some examples, instructions 114 may output a variety of possible objects along with the features. Each output may include a probability. For example, computing device 100 may indicate that the probability of an object of being a dog is 0.1, the probability of an object being a person is 0.5, and the probability of an object being a car is 0.4. In some examples, each fully connected layer may indicate the probability of an object being a specific object. For example, one fully connected layer may check whether the object is a car, another fully connected layer may check whether the object is a person, etc. Instructions may determine that the output with the highest probability is the classification of the object (e.g., the object is a person). In some examples, the first image input may have multiple specific regions, instructions 114 may determine that the fully connected layer with the highest probability for each region is the object for that region.

In neural networks with separate rounds of convolution filters, one round of convolution filters may be used to extract general features of an object. These features may be used for detection of the object (e.g. detecting that an object is an object of interest and not something that is in the background, i.e. classification). Another round of convolution filters may be used to extract features of an object for identification (e.g. determining that object is a particular type (that a dog is a specific Welsh Corgi dog). Accordingly, these networks require two separate rounds of convolution filters to detect an object (i.e. classification) and to determine features of the object (i.e. identification). Compared to these neural networks, computing device 100 uses one single round of convolution filters to detect the object and to determine a set of features for the object. These set of features may be used for both classification and identification of the object. Accordingly, computing device 100 may detect objects of interest and identify those objects quicker than neural networks that have at least two rounds of convolution filters for the same purposes.

Computing device 100 of FIG. 1, which is described in terms of processors and machine readable storage mediums, may include one or more aspects of computing device 300, neural network system 400, or neural network system 500.

Figure 2A:
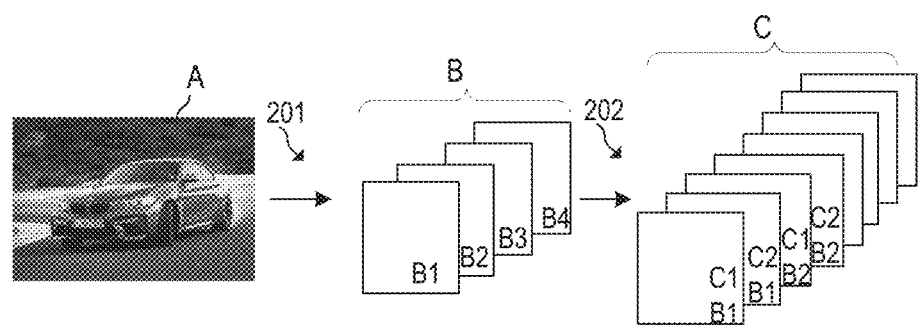
FIG. 2A is a flow diagram of using two separate convolution layers to detect objects and determine feature sets, according to some examples.

FIG. 2A is an example of a neural network with separate rounds of convolution filters to detect an object and to determine features of the object. The image input A is processed via a first round of convolution filters indicated by 201 to determine a set of feature maps B. Assuming that the first round of convolution filters 201 comprises 4 separate convolution filters, the result of the convolution round 201 is a set of four feature maps B1, B2, B3, and B4. This round of convolution filters may be used to detect objects. Each of these four feature maps B1, B2, B3, B4 then goes through a second round of convolution filters 202. The second round of convolution filters may be used for feature extraction from the detected objects to determine a set of feature maps C. The set of feature maps C are included for each of the feature maps in set of feature maps B. Assuming that the second round of convolution filters comprises 2 convolution filters, there would be a C feature map for each B1, B2, B3, and B4. Thus, as labeled in FIG. 2A, the C group feature maps would include two C feature maps for each B feature map. Thus, the C feature maps for B1 would be C1B1 and C2B1, the C feature maps for B2 would be C1B2 and C2B2, etc. Accordingly, the second round of convolution would take longer than the first round of convolution because the number of maps is increased. For example, in a neural network with separate rounds of convolutions, where each round has the same number (e.g., four) of convolution filters, the number of feature maps created with each round rises exponentially. The first round would create $4^1$ (4) feature maps. The second round would create $4^2$ (16) feature maps. A third round would create $4^3$ (64) feature maps. Thus, in neural networks that use multiple rounds of convolutions, the latency and delay that each convolution round uses may be exponential.

Figure 2B:
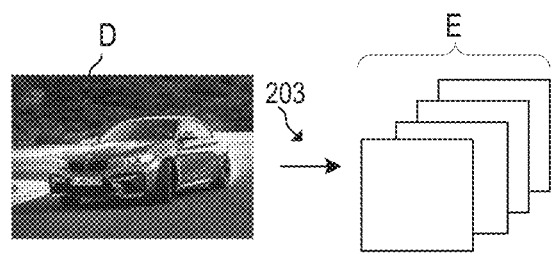
FIG. 2B is a flow diagram of using one single convolution layer to detect objects and determine features sets, according to some examples.

FIG. 2B is an example of a neural network with the characteristics as disclosed herein (e.g., computing device 100, computing device 300, neural network system 400, neural network system 500, etc.) with one round of convolution filters to detect an object and to determine features of the object. The image input D is processed through a first round of convolution filters 203. The resulting feature maps E are equal to the number of convolution filters used in the first round. Based on these maps, the neural network may detect objects and, at the same time, determine set of features for the objects. Accordingly, the time used in the neural network of FIG. 2B is shorter than the time used in the network of FIG. 2A as neural network of FIG. 2B does not require multiple convolution rounds. This is the same even considering that some neural networks may include other convolution filters to determine other things, such as regions of interests. For example, a neural network system with two convolution rounds (one to detect the object and another to determine the features of the object) and a separate region of interest network would be slower than a neural network system with one convolution round (one to detect the object and to determine the features of the object) and a separate region of interest network.

Figure 2C:
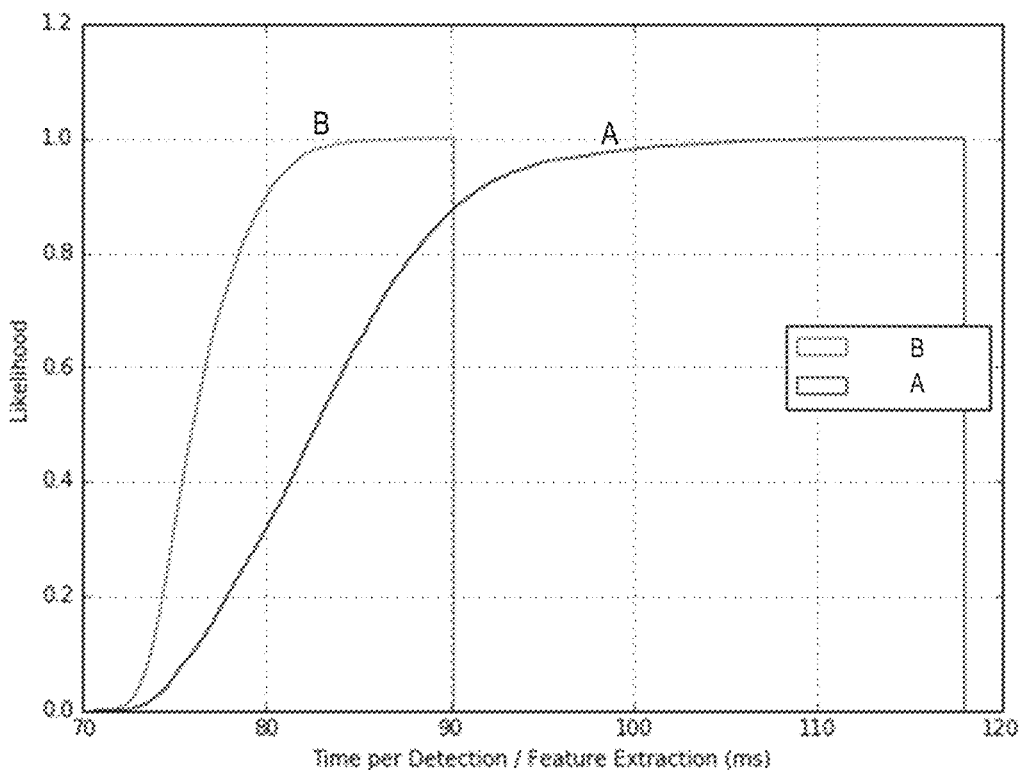
FIG. 2C is a comparison graph of time per detection using the methods shown in FIGS. 2A and 2B, according to some examples.

FIG. 2C is a graph showing the time period to detect and extract features from a neural network with two or more convolution rounds (line A) and a neural network with one convolution round (line B), as described in the examples herein. As seen by comparison of lines B and A, a neural network with one convolution round (B) may take 90 milliseconds while one with two or more convolution rounds (line A) may take almost 120 milliseconds. This may be per frame and a frame may have at least one object. Due to the more efficient processing of examples disclosed herein, these examples may be used for real-time image processing systems. In some examples, real-time image processing may be characterized by the amount of frames that is processed per seconds. In some examples, the amount of frames for real-time processing may be at least 11 (e.g., 14 frames per second, 15 frames per second, 20 frames per second, etc.) Accordingly, a real-time processing system may detect objects and determine a feature set for the detected objects for each of the 15 frames in the time span of a second. This real-time image processing may allow for the neural network to be used in tracking systems. This is because a rate of detection and feature determination slower than this (e.g., 10 frames a second, 5 frames a second, etc.) results in a fragmented picture of the scene and thus may result in the losing of objects that move too quickly through the scene that is being imaged.

Figure 3:
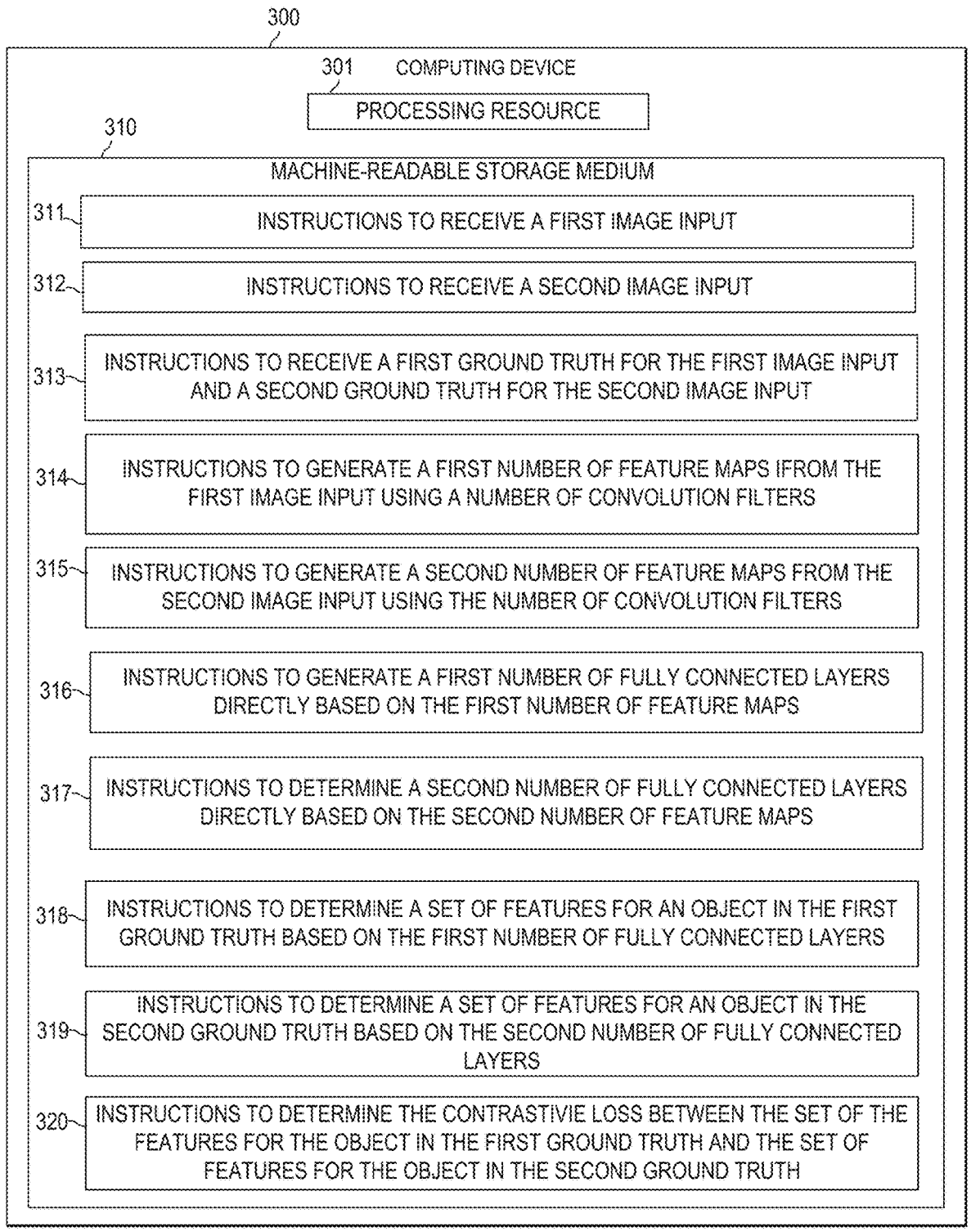
FIG. 3 is a block diagram of a computing device for training a neural network, according to some examples.

FIG. 3 is a block diagram of a computing device 300 to receive two image inputs and train based on those two image inputs. Computing device 300, like computing device 100, may comprise a machine-readable storage medium 310, a processing resource 301, and instructions 311-320 encoded on machine-readable storage medium 310. Processing resource 301 may execute instructions 311-320. In some examples, computing device 300 may be similar to computing device 100 except that computing device 300 has "two sets" of image processing functions such that it may be used to "train" a neural network to detect objects and determine features of objects using one round of convolution. In some examples, computing device 100 of FIG. 1 may also comprise two sets of image processing functions, as described herein in relation to FIG. 3, but only one set is used to process "live" images.

Instructions 311 may be executable by processing resource 301 to receive a first image input, similar to instructions 111. However, as compared to the first image input in instructions 111, the first image input received by computing device 300 may be part of a training set of images. Instructions 312 may be executable by processing resource 301 to receive a second image input. The first image may have a first number of objects and the second image may have a second number of objects. The types of objects in the first image and the types of objects in the second image may be similar or different to each other. Additionally, the number of objects in each image may be similar or different.

Instructions 313 may be executable by processing resource 301 to receive a first ground truth that is for the first image input and a second ground truth for the second image input. As used herein, a ground truth for an image may be an accurate description of one or more objects in the first image. For example, an image may include three objects: a person, a dog, and a car. The ground truth for the image may indicate that that particular image has a person, a dog, and a car. In some examples, the ground truth may also include region of interest data. The region of interest data may match regions of interest in the image to the ground truth for the image. For example, an image may have three regions of interest: R1, R2, and R3. The region of interest data for that image may indicate that R1 is matched with the person, R2 is matched with the car, and R3 is matched with the dog. In some examples, the ground truth may also have identifications that are assigned to objects in the image. The identifications may uniquely identify the object in the training set. For example, an object may be particular car with specific characteristics. The particular car may be given an identification of 12. The car may appear multiple times in a training set of images, in different images. In one image, the car may appear in one region while in another image, the car may appear in a different region. As discussed herein, based on the identification that is given to the particular car, computing device 300 may determine that it is the same object with the same characteristics even though it may appear in different images and different regions of interest.

In some examples, a ground truth for an image may include accurate descriptions for all objects in that image, including objects of interest and objects of non-interest. For example, if computing device 300 were interested in moving objects, the ground truth may include accurate descriptions for moving objects (a car) and non-moving objects (a building). Accordingly, in some examples, the region of interest data for the image may include regions of interest that include objects of interest and objects of non-interest. As used herein, a region of interest indicates a region that may or may not include an object of interest. Accordingly, in some examples, the first ground truth may comprise accurate descriptions for all the objects in the first image and the second ground truth may comprise accurate descriptions for all the objects in the second image.

Instructions 314 may be executable by processing resource 301 to generate a first number of feature maps from the first image input using a number of convolution filters. These instructions 314 are similar to instructions 112, as described above in relation to FIG. 1. Instructions 315 may be executable by processing resource 301 to generate a second number of feature maps from the second image input. The second number of feature maps are generated using the same convolution filters that are used in instructions 314. Accordingly, the first number and the second number of feature maps are the same number Thus, the maps themselves are not the same, but the amount of maps are the same because the same filters are used.

In some examples, the first number of feature maps may be used as an input for a separate region proposal network to determine specific regions of interest in the feature maps. This input provides the regions of interest in the first image input. The regions of interest identified by the separate region proposal network may be paired with the region of interest data (in the ground truth) to pair up the regions of interest to the description for each region of interest. The regions of interest may also allow the fully connected layers to focus on a smaller areas in the first image. In other examples, the pairing of the region of interests and the ground truth may be done via looking at the bounding boxes from the ground truths and the detected objects.

Instructions 316 may be executable by processing resource 301 to generate a first number of fully connected layers directly based on the first number of feature maps. This is similar as described above in relation to computing device 100. Instructions 317 may be executable by processing resource 301 to generate a second number of fully connected layers directly based on the second number of feature maps.

Instructions 318 may be executable by processing resource 301 to determine a set of features for an object in the first ground truth based on the first number of fully connected layers. As discussed above in relation to instructions 313, the first ground truth may include accurate descriptions for the objects in the first image. Additionally, as discussed above, the region proposal network may determine regions of interest that are paired with the ground truth for the first image such that computing device 300 understands what objects are for what regions of interest. Instructions 318 thus allows computing device 300 to associate a set of features for the objects in the ground truth. Accordingly, the result of executing instructions 318 may be an object (as set by the ground truth) and a set of features for that object (based on the feature maps).

Instructions 319 may be executable by processing resource 301 to determine a set of features for an object in the second ground truth based on the second number of fully connected layers. As discussed above in relation to instructions 313, the second ground truth may include accurate descriptions for the objects in the second image. Additionally, as discussed above, the region proposal network may determine regions of interest that are paired with the ground truth for the second image such that computing device 300 understands what objects are for what regions of interest. Instructions 319 thus allows computing device 300 to associate a set of features for the objects in the ground truth. Accordingly, the result of executing instructions 319 may be an object (as set by the ground truth) in the second image and a set of features for that object (based on the feature maps).

Instructions 320 may be executable by processing resource 301 to determine a contrastive loss between the set of features for the object in the first ground truth and the set of features for the second ground truth. As used herein, a contrastive loss may be calculated using a contrastive loss function which calculates the similarity between the feature sets of the objects.

As discussed above, the first image may have numerous objects and the second image may have numerous objects. Accordingly, the ground truths for these objects may include a number of objects and the fully connected layers may determine a feature set for each of the objects in the first image and the second image.

Accordingly, in some examples, computing device 300 may determine how to pair up objects from the first image and objects from the second image to determine a contrastive loss.

Thus, in some examples, instructions 320 may also include instructions to ignore objects whose ground truth indicate that the objects are not objects of interest. For example, (from the region proposal network), it may be determined that a first image has four regions of interest R0, R1, R2, and R3. The ground truth and the region of interest data may indicate that the R0 is of a building with an identification of 0. R1 is a person with an identification of 34, R2 is a person with an identification of 12, and R3 is a tree with an identification of 5. From the region proposal network, it may be determined that a second image has four regions of interest R0, R1, R2, and R3. The ground truth and the region of interest data may indicate that the R0 is of a person with an identification of 34, R1 is a building with an identification of 10, R2 is a person with an identification of 8, and R3 is a person with an identification of 11. Because computing device is configured to track objects that move through the scene, it may be configured that objects that do not move are not objects of interest. Thus computing device may ignore objects that are not moving objects in determining which objects to pair for contrastive loss calculation (e.g., the building and the tree).

For the objects that are objects of interest, instructions 320 may include instructions to determine a similarity score between the objects in the two images. The similarity score may indicate whether the objects are identical objects. In some examples, the similarity score are based on the identifications that are assigned to the objects. For example, R0 in the second image is a person with an identification of 34. Because R1 in the first image is a person with an identification of 34, computing device 300 may determine that the similarity score is 1 as the identifications of both regions are the same. In contrast, R2 in the second image is a person with the identification of 8. While R1 in the first image is also a person, it has an identification of 34. Accordingly, computing device 300 may determine that the similarity score is 0 as the identifications of both regions are not the same.

In some examples, computing device 300 may pair up each object that has the same description to determine contrastive loss calculations for the pairs of objects. For example, R1 of the first image (person, identification 34) is paired up with R0 of the second image (person, identification 34). R1 of the first image is also paired up with R2 of the second image (person, identification 8). R1 of the first image is also paired up with R3 of the second image (person, identification 11). Additionally, R2 of the first image (person, identification 12) is paired up with R of the second image (person, identification 34). R2 of the first image is also paired up with R2 of the second image (person, identification 8). R2 of the first image is also paired up with R3 of the second image (person, identification 11). The pairings of R2 of the first image would each have the similarity scores of 0 and the pairings of the R1 in the first image would have one similarity score of 1 and two similarity scores of 0.

In some examples, instead of calculating contrastive loss for all of the possible pairs, only a subset is chosen. The subset is chosen such that there are an equal number of pairs that have similarity scores of 0 and similarity scores of 1. This subset may allow for increased efficiency and stability (i.e. non-biased) in training.

In some examples, the contrastive loss results from these pairings may be used to modify the filters used in the convolution round and the parameters of the fully connected layer(s) to encourage the features of similar objects resulting in a value that indicates they are close together while features of dissimilar objects resulting in a value that indicates they are further apart (e.g., above a certain threshold). Accordingly, the contrastive losses may be used to back-propagate the filters and/or parameters and used to "train" the neural network.

Computing device 300 of FIG. 3, which is described in terms of processors and machine readable storage mediums, may include one or more aspects of computing device 100, neural network system 400, or neural network system 500.

Figure 4:
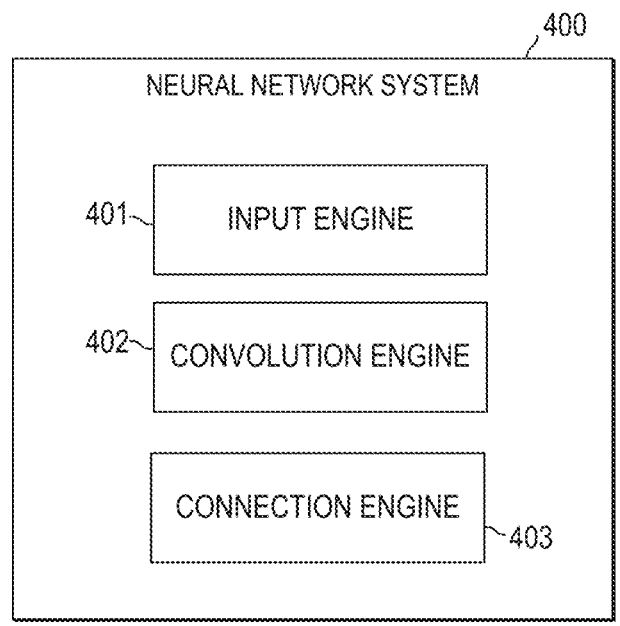
FIG. 4 is a block diagram of a neural network system to detect an object and determine a set of features for the object using one convolution layer, according to some examples.

FIG. 4 is a block diagram of a neural network system 400 to detect objects and determine a set of features for the objects in an image. Neural network system 400 comprises input engine 401, convolution engine 402, and connection engine 403. Other engines may be added to neural network system 400 for additional or alternative functionality.

Each of engines 401, 402, 403, and any other engines, may be any combination of hardware (e.g., a processor such as an integrated circuit, a GPU, or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, neural network system 400 may include additional engines.

Each engine of neural network system 400 can include at least one machine-readable storage mediums (for example, more than one) and at least one computer processor (for example, more than one). For example, software that provides the functionality of engines on neural network system 400 can be stored on a memory of a computer to be executed by a processor of the computer.

Input engine 401 is an engine that allows neural network system 400 to receive image input. In some examples, input engine 401 may connect to an image sensor that may feed input engine 401 image frames from a live scene.

Convolution engine 402 is an engine that allows neural network system to generate a number of feature maps from one of the images (i.e. an image frame) received by input engine 401. Convolution engine 402 may comprise a number of convolution filters that are slid across the image frame. The filters, as described above in relation to instructions 112, may comprise mathematical operations that are done on the image. The mathematical operations may be varied, based on the contrastive loss values through training, such that the operations generate feature maps that will allow neural network system 300 to both 1) detect that object of interest is present and 2) determine specific features of that object using the one round of convolution on the image input.

Convolution engine may also employ other operations on the feature maps, such as a ReLU layer, and a pooling layer to generate derivative maps from the feature maps. These are described above. Additionally, in some examples, convolution engine may take regions proposed by a region proposal network to limit the areas in the feature maps. For example, a region proposal network may take as input the feature maps and determine regions that may be of interest in the image. Those regions serve as input to the convolution engine to limit the feature maps to those regions. The limit of the feature maps may be done before the pooling layer. For example, the pooling layer may look at only the regions proposed by the region proposal network.

Connection engine 403 allows neural network system to generate a number of fully connected layers directly based on the feature maps. As discussed above, these may be the feature maps themselves, or maps derived from the feature maps, such as pooled maps, and/or limited feature maps (using data from the region proposal network). Connection engine 403 takes the maps from the previous layer and connects them into a number of fully connected layers using different parameters such as weights and mathematical operations. For example, in an situation where there were five feature maps and those feature maps were limited to specific regions and those specific regions were pooled, there would be five pooled maps. Connection engine 403 takes these five pooled maps and connects them together to form a fully connected layer. One fully connected layer may determine a probability that a certain object in the image is something. Another fully connected layer may determine a probability that a certain object in the image is something else. Connection engine 403 may determine from the probabilities of each fully connected layer that an object is a specific object based on the highest probability.

Because there is no separate convolution round to detect an object and another separate convolution round to determine the features of the object, neural network system 400 may process image frames in real-time. This allows for the ability to use the determinations of neural network system 400 to track objects in a scene. For example, in the first image frame, neural network system 400 may detect an object and determine that the object has a particular set of features. In a second image frame that comes after the first image frame, neural network 400 may quickly determine that the same object with the same particular set of features is there by matching the feature set in the first image to the feature set in the second image. This allows for tracking of the object between frames, allowing the system to understand that the object detected in the first image frame is the same object as the object detected in the second image frame and not a different object that is new to the scene since the first image frame.

Neural network system 400, which is described in terms of engines having hardware and software, may include one or more aspects of computing device 100, computing device 300, or neural network system 500.

Figure 5:
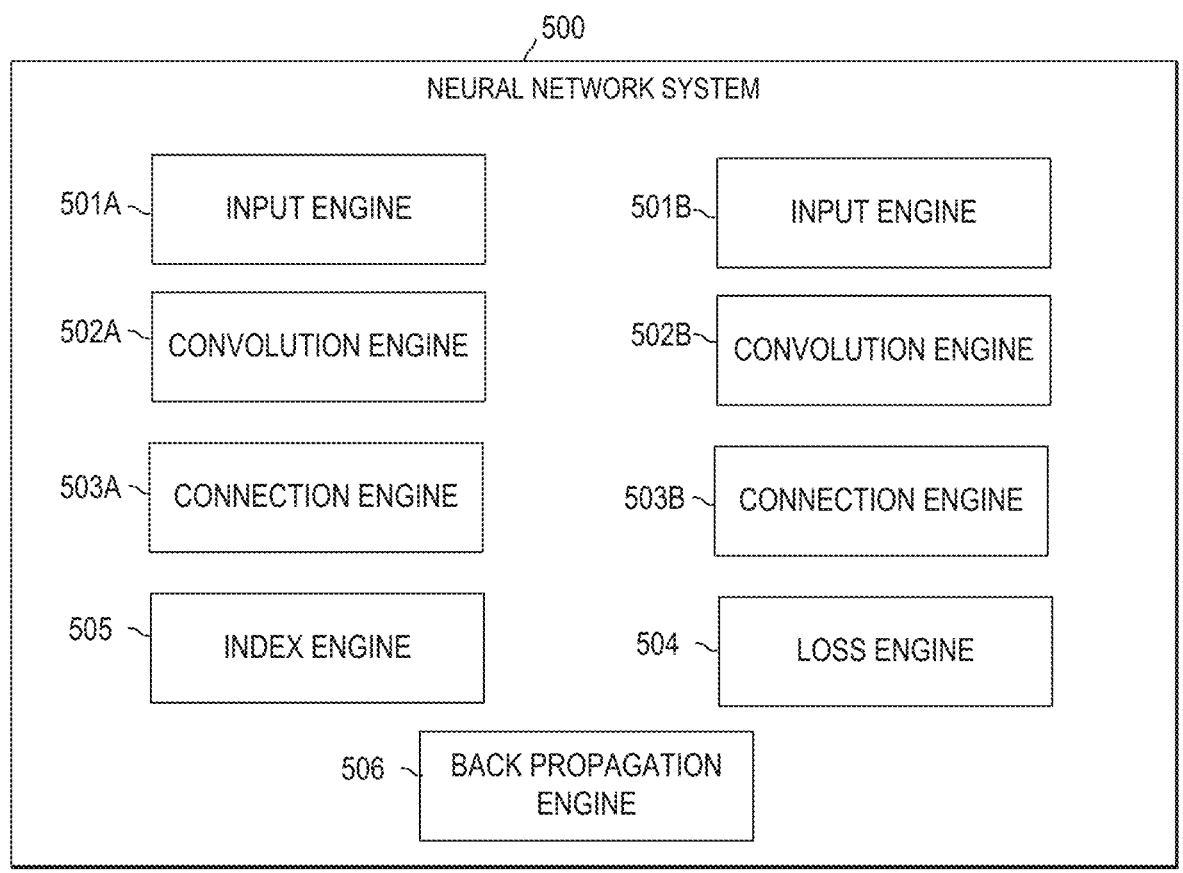
FIG. 5 is a block diagram of a Siamese architecture for training, according to some examples.

FIG. 5 is a block diagram of a neural network system 500 comprising a dual circuit training architecture (e.g., a Siamese architecture) that may be used to back-propagate the filters and parameters of the fully connected layers. Neural network system 500 comprises two sets of image processing functions: a first image processing function comprising an input engine 501A, a convolution engine 502A, and a connection engine 503A; and a second image processing function comprising input an engine 501B, convolution engine 502B, and a connection engine 503B. The two sets may process images simultaneously using the same number and types of convolution filters (to generate the feature maps) and the same number and type of parameters (to generate the fully connected layers).

Thus, input engine 501A may receive a first image input and input engine 501B may receive a second image input. In some examples, the first and second image inputs are not from an image sensor (e.g., a video stream), but from a training set of still images. In some examples, the training set may include images that have the same object but from different angles and viewpoints. For example, a first image may include a dog that is sitting and a second image may include the same dog when it is running. This allows the neural network to consider objects from different viewpoints, which may allow increased efficiency in tracking objects.

Convolution engine 502A may generate a first number of feature maps from the first image input using a number of convolution filters. Convolution engine 502B may generate a second number of feature maps from the second image input using the same number of convolution filters that are used by convolution engine 502A. Additionally, in some examples, convolution engine 502A may rely on input from a region proposal network to determine regions of interest in the first number of feature maps. Convolution engine 502B may also rely on input from the region proposal network to determine regions of interest in the second number of feature maps. Convolution engine 502A may also use a pooling layer to generate pooling maps from the feature maps. The pooling layer may focus on regions of interest in the feature maps for its pooling functions. Convolution engine 502B may similarly do the same for its feature maps.

Loss engine 504 may allow neural network system 500 to receive ground truths for the first image input and the second image input. The ground truths may be entered, for example, by an administrator of the neural network system. In other examples, it may be part of a data set that is associated to the training image input set.

As discussed above, the ground truth for each image input may include accurate descriptions of the objects in the images. In some examples, the descriptions may be a broad classification of an object (e.g., car, person). The ground truths may also include identifications for each object that identify the specific object to the neural network system 500. For example, a specific car may be given the identification of 30 and another different car may be given the identification of 10. These cars, while both are cars (as indicated by the description), are different from each other (as indicated by their different identifications). Additionally, the ground truths for each image input may also include region of interest data for each image input. The region of interest data may indicate which region of interest (as determined by the region proposal network) pairs up with which description in the ground truth. Accordingly, loss engine 504 may allow neural network system 500 to know which region in the first image input and the second image input is what object.

Connection engine 503A may allow neural network system 500 to generate a number of fully connected layers directly based on the feature maps (or maps derived from the feature maps, such as pooling maps, as described above). Connection engine 503A may detect objects that are in the first image input and determine a set of features for each object. The detection and determination are based on these fully connected layers. Because the feature maps have been limited to the regions of interest (as proposed by the region proposal network), the objects and set of features that are determined are for the regions of interest. Similarly, the ground truths are also connected to those regions of interest. Thus, the set of features determined by the connection engine 503A are for objects in the ground truth. Connection engine 503B similarly does the same for the second input image.

Index engine 505 may allow neural network system 500 to determine which objects in the first image input and the second image input to compare and to calculate contrastive loss for. Because there may be numerous pairings between the objects in the first image input and the second image input, index engine 505 allows efficient and stable training of neural network system 500.

In some examples, index engine 505 may determine which objects to ignore. As discussed above, index engine 505 may ignore objects that are not of interest. For example, a neural network that will be used for tracking may be designed to track fast moving objects. Accordingly, the objects that may be ignored during training of that neural network are objects that are static (e.g., objects that are in the background). The ignored objects from either image input are not paired with objects from the other image input.

In some examples, index engine 505 may determine which objects to pair based on a similarity score. Index engine 505 may, in some examples, determine the similarity score based on the identifications in the ground truth. As discussed above, the descriptions in the ground truth may be assigned identifications. The identification is unique to the object and may be used to indicate that an object in the first image and an object in the second image are the same. The identification may be more specific than the descriptor of the object. Accordingly, the first image may have two types of cars, car1 having the identification 50 and car2 having the identification 30. The second image may have one type of car car3 having the identification 50. Based on the identification 50, index engine 505 may determine that the similarity score for the pair car1 and car3 is 1. Additionally, based on the identifications of 30 and 50, index engine 505 may determine that the similarity score for the pair car2 and car3 is 0. In some examples, car1 and car3 may be from different angles and/or different time of day. However, because they have the same identification, the similarity score still indicates that they are the same object. Thus, the similarity score reflects the object's true identity and does not depend on what the object is doing and/or lighting factors. This allows neural network system 500 to learn deviations in appearance for that object and compare different versions of the same object. Accordingly, this may be helpful in systems that may be used for tracking objects.

Based on the similarity scores of the pairs of objects, index engine 505 may chose an equal number of pairs that have a positive similarity score (e.g., 1), indicating that those two objects are the same, and pairs that have a negative similarity score (e.g., 0), indicating that the two objects are not the same.

Loss engine 504 may allow neural network system 500 to calculate a contrastive loss for the two objects. In some examples, the set of features for the objects in the pairs are used to determine the contrastive loss. In some examples, loss engine 504 may calculate contrastive loss for all pairs that index engine 505 determined to be compared. In some examples, loss engine 504 may generate a contrastive loss matrix to include all these comparisons. The loss values for each pair may be added (e.g., vertically or horizontally across the matrix) and combined losses for may be used to vary the filters and/or parameters used. The matrix may provide a complete picture over a contrastive loss for one single pair because the matrix includes losses from pairs that are similar and losses from pairs that are different.

Back propagation engine 506 may allow neural network system 500 to back-propagate the filters and/or the parameters (in the fully connected layers) based on the contrastive loss matrix.

Neural network system 500, which is described in terms of engines having hardware and software, may include one or more aspects of computing device 100, computing device 300, or neural network system 400.

Figure 6:
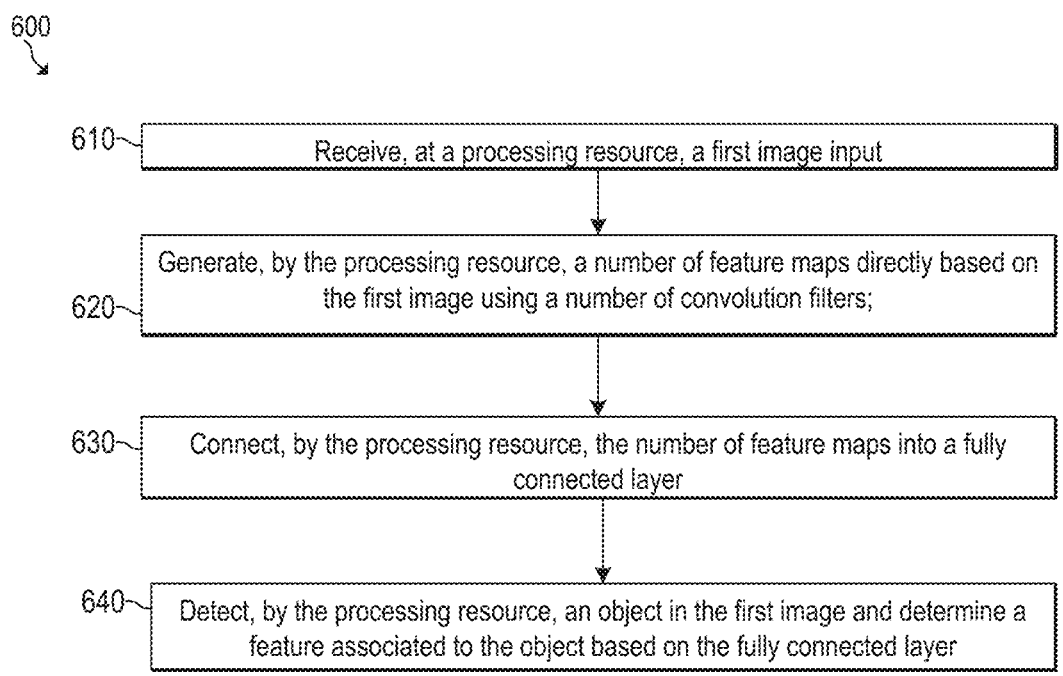
FIG. 6 is a flowchart of a method of detecting an object and determining a feature for the object using one convolution layer, according to some examples.

FIG. 6 illustrates a flowchart for a method 600 to detect an object and determine a feature associated to the object using one set of convolution filters for detecting the object and determining the feature. Although execution of method 600 is described below with reference to computing device 100 of FIG. 1, other suitable devices for execution of method 600 may be used (e.g., computing device 300 of FIG. 3, neural network system 400 of FIG. 4, neural network system 500 of FIG. 5, etc.).

At 610 of method 600, instructions 111 cause processing resource 101 of computing device 100 to receive a first image input. In some examples, the first image input may be from an image sensor. At 620 of method 600, instructions 112 cause processing resource 101 of computing device 100 to generate a number of feature maps directly based on the first image using a number of convolution filters. At 630 of method 600, instructions 113 cause processing resource 101 of computing device 100 to connect the number of feature maps into a fully connected layer. At 640 of method 600, instructions 114 cause processing resource 101 of computing device 100 to detect an object in the first image and determine a feature associated to the object based on the fully connected layer.

Although the flowchart of FIG. 6 shows a specific order of performance of certain functionalities, method 600 is not limited to that order. For example, some of the functionalities shown in succession may be performed in a different order, may be executed concurrently or with partial concurrence, or a combination thereof. In some examples, functionalities described herein in relation to FIG. 6 may be provided in combination with functionalities described herein in relation to any of FIGS. 1-5 and 7-8.

Figure 7:
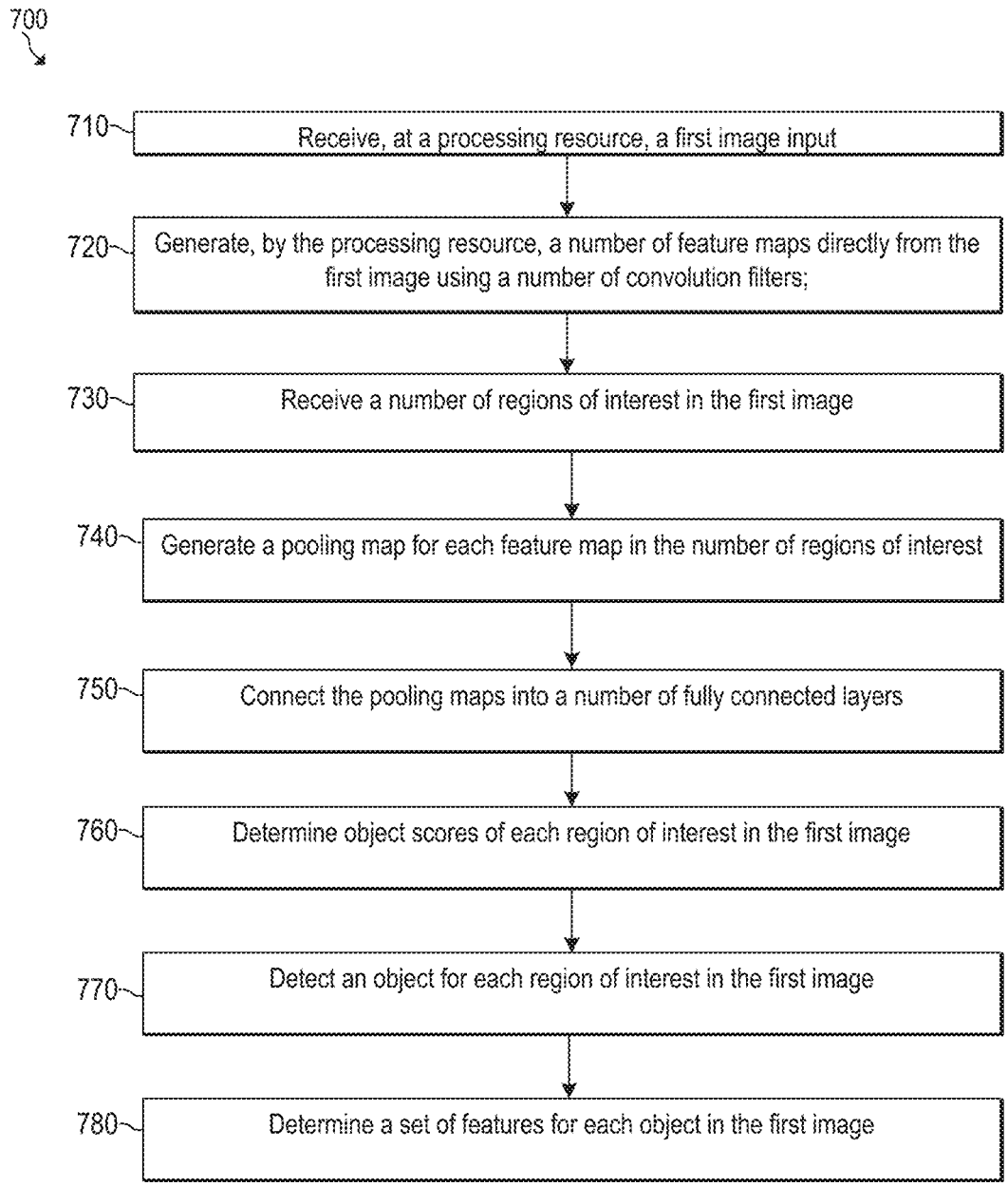
FIG. 7 is a flowchart of a method of detecting an object and determining a feature for the object using one convolution layer, a pooling layer, and regions of interest, according to some examples.

FIG. 7 illustrates a flowchart for a method 700 to detect an object and determine a feature for the object using one set of convolution filters and regions of interest. Although execution of method 700 is described below with reference to neural network system 300 of FIG. 3, other suitable devices for execution of method 700 may be used (e.g., computing device 100 of FIG. 1, neural network system 400 of FIG. 4, neural network system 500 of FIG. 5, etc.).

710 is similar to 610 and 720 is similar to 620. Accordingly, the descriptions of 610 and 620 apply to steps 710 and 720, respectively.

At 730 of method 700, convolution engine 402 may receive regions of interest in the first image from a region proposal network (RPN). As discussed above, a RPN may take the feature maps generated by convolution engine 402 and determine regions of interest in the first image. Convolution engine 402 may take these regions of interest and may limit the feature maps it generates to these regions of interest. This allows a more efficient processing of the feature maps.

At 740 of method 700, convolution engine 402 may generate a pooling map for each feature map in the number of regions of interest. Thus, the pooling layer may focus in the regions of interest to determine the pooling map.

At 750 of method 700, connection engine 403 connects the pooling maps into a number of fully connected layers. As discussed above, the pooling maps may be characterized as derived maps from the feature maps generated at 720 and thus, the fully connected layers generated at 750 may be characterized as "directly based on" the feature maps. At 760 of method 700, connection engine 403 may determine scores for each region of interest in the first image input. The scores may give a probability of the object may be in the region of interest in the first image. At 770 of method 700, convolution engine 403 may detect an object for each region of interest. In some examples, the detected object is determined by taking the highest score in 760. At 780 of method 700, convolution engine 403 may determine a set of features for each object in the first image.

Although the flowchart of FIG. shows a specific order of performance of certain functionalities, method 700 is not limited to that order. For example, some of the functionalities shown in succession may be performed in a different order, may be executed concurrently or with partial concurrence, or a combination thereof. In some examples, functionalities described herein in relation to FIG. 7 may be provided in combination with functionalities described herein in relation to any of FIGS. 1-6, 8.

Figure 8:
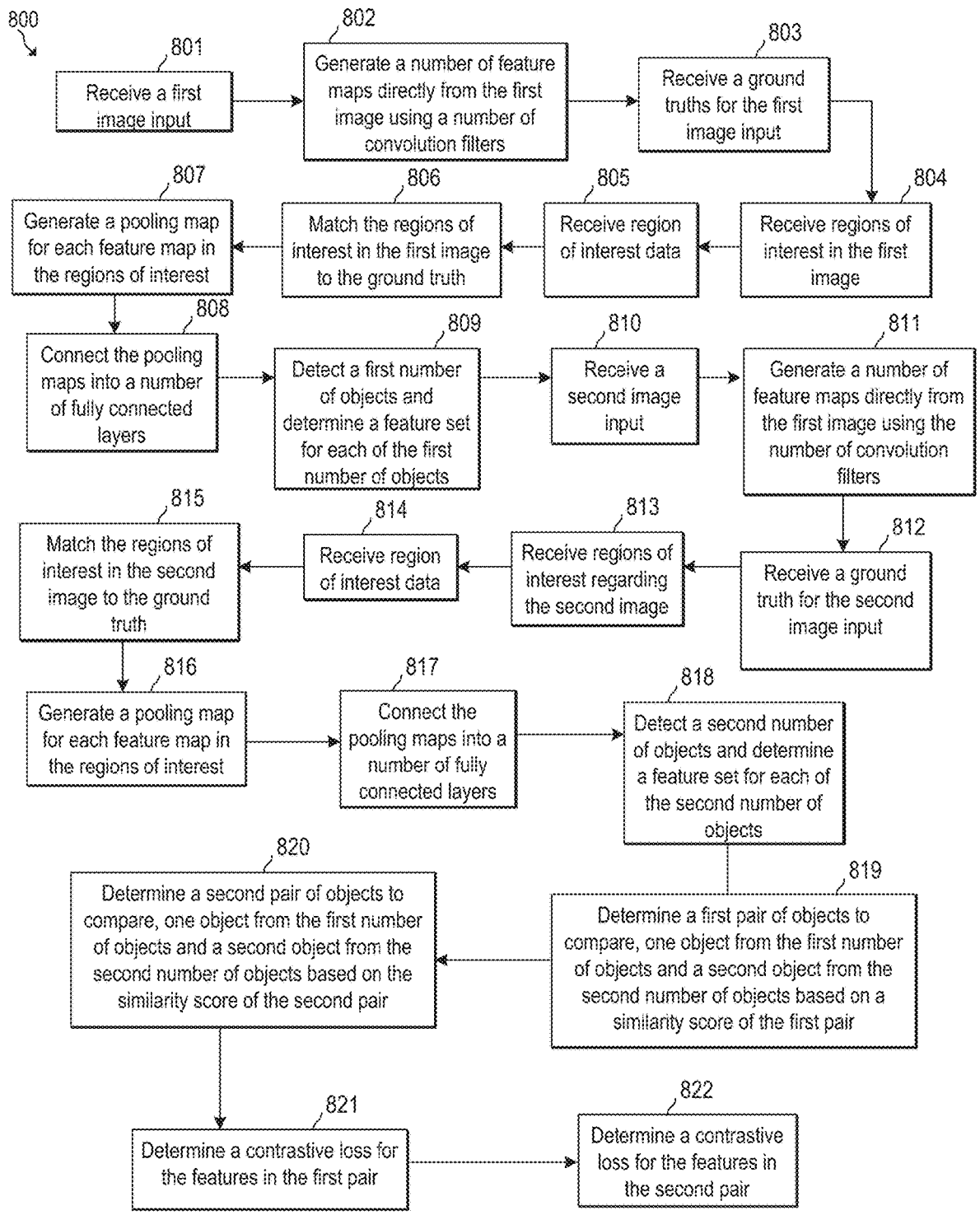
FIG. 8 is a flowchart of training a neural network by comparing similar objects and features to determine a contrastive loss, according to some examples.

FIG. 8 illustrates a flowchart for a method 800 to train a neural network to detect an object and determine features for the object. Although execution of method 800 is described below with reference to neural network system 500 of FIG. 5, other suitable devices for execution of method 700 may be used (e.g., computing device 100 of FIG. 1, computing device 300 of FIG. 3, neural network system 400 of FIG. 4, etc.).

At 801 of method 800, input engine 501A receives a first image input. As discussed above, the first image input may comprise a training set. At 802 convolution engine 502A generates a number of feature maps directly from the first image using a number of convolution filters. At 803 of method 800, loss engine 504 receives a ground truth for the first image input. As discussed above, the ground truth may comprise accurate descriptions for objects in the first image. The ground truth may include identifications for the accurate descriptions. The identifications may uniquely identify the object across the training set of images. At 804, convolution engine 502A may receive regions of interest in the first image. As discussed above, this may be provided by a RPN. At 805, loss engine 504 may receive region of interest data for the first image. At 806, loss engine 504 may match the regions of interest in the first image to the ground truth. Specifically, loss engine 504 may rely on the region of interest data to connect the accurate descriptions to the regions of interest provided by the RPN, such that each region of interest in the first image input is matched to an accurate description in the ground truth.

At 807 of method 800, convolution engine 502A generates a pooling map for each feature map in the regions of interest. At 808 of method 800, connection engine 503A connects the pooling maps into a number of fully connected layers. At 809 of method 800, connection engine 503A detects a first number of objects and determines a feature set for each of the first number of objects. The objects and the feature set that are determined correlate to the regions of interest. Accordingly, neural network system 500 now has an accurate description for the regions of interest (from the ground truth) and the feature sets that it has detected for the regions of interest (from the fully connected layers) in the first image input. This may be used calculate the contrastive loss, as discussed below.

At 810 of method 800, input engine 501B receives a second image input. As discussed above, the second image input may be part of the same training set as the first image input. At 811 convolution engine 502B generates a number of feature maps directly from the second image using the same convolution filters used by convolution engine 502A at 802. At 812 of method 800, loss engine 504 receives a ground truth for the second image input. As discussed above, the ground truth may comprise accurate descriptions (i.e. object classifiers) for objects in the first image. The ground truth may include identifications for the accurate descriptions. The identifications may uniquely identify the object across the training set of images. At 813, convolution engine 502B may receive regions of interest in the second image. As discussed above, this may be provided by a RPN. At 814, loss engine 504 may receive region of interest data for the second image. At 815, loss engine 504 may math the regions of interest in the second image to the ground truth. Specifically, loss engine 504 may rely on the region of interest data to connect the accurate descriptions to the regions of interest provided by the RPN, such that each region of interest in the second image input is matched to an accurate description in the ground truth.

At 816 of method 800, convolution engine 502B generates a pooling map for each feature map in the regions of interest. The pooling function that is used is similar to the function used at 808. At 817 of method 800, connection engine 503B connects the pooling maps into a number of fully connected layers. The parameters used to generate the fully connected layers are similar to the parameters used at 808. At 818 of method 800, connection engine 503B detects a second number of objects and determines a feature set for each of the second number of objects. The objects and the feature set that are determined correlate to the regions of interest. Accordingly, neural network system 500 now has an accurate description for the regions of interest (from the ground truth) and the feature sets that it has detected for the regions of interest (from the fully connected layers) in the second image input. This may be used calculate the contrastive loss, as discussed below.

At 819, index engine 505 may determine a first pair of objects to compare. The first pair may have an object from the first image and an object from the second image. As discussed above, the first pair may have a similarity score that indicates that the objects are the same. The similarity score may be based, as discussed above, on the identifications assigned to the accurate descriptions in the ground truth.

At 820, index engine 505 may determine a second pair of objects to compare. The second pair may have an object from the first image and an object from the second image. As discussed above, the first pair may have a similarity score that indicates that the objects are different. The similarity score may be based, as discussed above, on the identifications assigned to the accurate descriptions in the ground truth.

At 821, loss engine 504 may determine a contrastive loss for the first pair. The contrastive loss may be calculated using the feature sets of the objects (as detected by the fully connected layers). At 822, loss engine 504 may determine a contrastive loss for the second pair. The contrastive loss may be calculated using the feature sets of the objects (as detected by the fully connected layers).

Although the flowchart of FIG. 8 shows a specific order of performance of certain functionalities, method 800 is not limited to that order. For example, some of the functionalities shown in succession may be performed in a different order, may be executed concurrently or with partial concurrence, or a combination thereof. In some examples, functionalities described herein in relation to FIG. 8 may be provided in combination with functionalities described herein in relation to any of FIGS. 1-7.

All of the features disclosed in this specification (including any accompanying claims, abstract and drawings), and/ or all of the elements of any method or process so disclosed, may be combined in any combination, except combinations where at least some of such features and/or elements are mutually exclusive.

What is claimed is:

1. A non-transitory machine-readable storage medium comprising instructions, that, when executed, cause a processing resource to:
   receive a first image input having a first number of objects and a second image input having a second number of objects;
   generate a first number of feature maps from the first image input using a number of filters;
   generate a second number of feature maps from the second image input using the number of filters;
   receive a first ground truth for the first image input, the first ground truth including a set of features for at least one object of the first number of objects;
   receive a second ground truth for the second image input, the second ground truth including a set of features for at least one object of the second number of objects;
   determine a contrastive loss between the set of features for the object in the first ground truth and the set of features for the object in the second ground truth; and
   back-propagate a filter from the number of filters based on the contrastive loss.

2. The non-transitory machine-readable storage medium of claim 1, wherein the first ground truth further includes first region of interest data.

3. The non-transitory machine-readable storage medium of claim 2, wherein the first region of interest data matches regions of interest in the first image input to the first ground truth.

4. The non-transitory machine-readable storage medium of claim 1, wherein the first ground truth divides the first number of objects into a first set of objects of interest and a second set of objects of non-interest.

5. The non-transitory machine-readable storage medium of claim 1, further comprising instructions to back-propagate a variable associated with a number of fully connected layers based on the contrastive loss.

6. The non-transitory machine-readable storage medium of claim 1, further comprising instructions to generate a first number of fully connected layers based on the first number of feature maps, and generate a second number of fully connected layers based on the second number of feature maps.

7. The non-transitory machine-readable storage medium of claim 1, further comprising instructions to generate pooling maps from the first number of feature maps.

8. A system comprising:
   a processor; and
   a non-transitory computer readable medium including instructions executable by the processor to:
      receive a first image input;
      generate a number of feature maps directly based on the first image input;
      connect the number of feature maps based on relationship parameters, and detect a first object in the first image and determine a feature associated to the first object based on the connected feature maps;
      receive a second image input;
      generate a second number of feature maps directly based on the second image input;
      connect the second number of features maps based on the relationship parameters and detect a second object in the second image and determine a feature associated to the second object;
modify a relationship parameter from the relationship parameters.

9. The system of claim 8, further comprising instructions to determine a contrastive loss between the first object and the second object.

10. The system of claim 9, wherein determining the contrastive loss further comprises receiving a first ground truth for the first object and a second ground truth for the second object.

11. The system of claim 10, wherein determining the contrastive loss further comprises determining a similarity score of the first object and the second object based on the first ground truth and the second ground truth.

12. The system of claim 11, wherein determining the contrastive loss further comprises pairing the first object and the second ground truth based on the similarity score.

13. The system of claim 8, wherein the first object is detected and the feature is determined in real-time.

14. The system of claim 13, wherein the real-time is 90 milliseconds or less.

15. A method comprising:
receiving, at a processing resource, a first image input having a first number of objects and a second image input having a second number of objects;
generating, by the processing resource, a first number of feature maps based on the first image input using a number of convolution filters;
generating, by the processing resource, a second number of feature maps based on the first image input using a number of convolution filters;
receive a first ground truth for the first image input, the first ground truth including a set of features for at least one object of the first number of objects;
receive a second ground truth for the second image input, the second ground truth including a set of features for at least one object of the second number of objects;
determine a contrastive loss between the set of features for the object in the first ground truth and the set of features for the object in the second ground truth; and
modifying, by the processing resource, a filter in a number of filters based on a contrastive loss at least partially derived from the number of feature maps.

16. The method of claim 15, further comprising:
connecting, by the processing resource, the number of feature maps into a number of fully connected layers; and
detecting, by the processing resource, a first number of objects in the first image and determining a feature associated to each object based on the number of fully connected layers.

17. The method of claim 16, further comprising:
receiving, at the processing resource, a second image input;
generating, by the processing resource, a second number of feature maps directly based on the second image input using the number of filters, wherein the generation of the second number is at a same time as the generation of the first number;
connecting, by the processing resource, the second number of feature maps into a second number of fully connected layers;
determining, by the processing resource, a feature for each object in the second image input based on the second number of fully connected layers;
wherein the contrastive loss is determined for the feature associated to the one object from the first number of objects and the feature associated to the one object from the second image input.

18. The method of claim 17, further comprising receiving, by the processing resource,
a first ground truth, wherein the first ground truth comprises an identifier for each object in the first number of objects; and
a second ground truth, wherein the second ground truth comprises an identifier for each object in the second image input, and wherein the contrastive loss is determined from the first ground truth and the second ground truth.

19. The method of claim 17, further comprising determining, by the processing resource, similarity scores between the objects in the first number of objects and the objects in the second image input.

20. The method of claim 19, further comprising determining, by the processing resource, a pair of objects based on the similarity scores, wherein the pair comprises an object from the first number of objects and an object from the objects in the second image input.

* * * * *